United States Patent [19]
Martinelli et al.

[11] 4,443,398
[45] Apr. 17, 1984

[54] FORMING PROCESS FOR LIGHT GAUGE POLYMER SHEET MATERIAL

[75] Inventors: Lawrence G. Martinelli, San Jose, Calif.; Mark R. Garrison, Minden, Nev.

[73] Assignee: Verbatim Corporation, Sunnyvale, Calif.

[21] Appl. No.: 287,271

[22] Filed: Jul. 27, 1981

Related U.S. Application Data

[63] Continuation-in-part of Ser. No. 102,777, Dec. 12, 1979, Pat. No. 4,294,640.

[51] Int. Cl.³ .................. B29C 25/00; B29C 17/02; B65D 85/30; B31F 1/00
[52] U.S. Cl. .................. 264/235; 264/285; 264/DIG. 66; 206/312; 156/227
[58] Field of Search .......... 264/339, 232, 235, 231, 264/285, 296, 346, 342, DIG. 66, 320; 156/204, 227, 213, 212; 206/309, 310, 311, 312; 493/946, 409, 413

[56] References Cited
U.S. PATENT DOCUMENTS

| | | | |
|---|---|---|---|
| 2,892,217 | 6/1959 | Luboshez | 264/339 |
| 3,200,182 | 8/1965 | Hechethammer | 264/235 |
| 3,696,187 | 10/1972 | Glassman | 264/320 |
| 4,002,519 | 1/1977 | Moseley et al. | 156/204 |
| 4,153,665 | 5/1979 | Vecchiotti et al. | 264/339 |
| 4,304,621 | 12/1981 | Appoldt et al. | 156/227 |

OTHER PUBLICATIONS

G. E. Technical Marketing-Sheet Products-Primer L-28 p.

Primary Examiner—Edward C. Kimlin
Assistant Examiner—Louis Falasco
Attorney, Agent, or Firm—Thomas E. Schatzel

[57] ABSTRACT

A method for cold-forming light gauge polymer sheet material by application of localized heat to the area of the fold. In the manufacture of Lexan polycarbonate flexible magnetic disk jackets, heat is applied to the folded edge by a heating element generally maintained uniformly at 375° F. The heating elements contacts the folded Lexan polycarbonate edge in a U-shaped trough having planar sidewalls generally perpendicular to a planar bottom wall.

7 Claims, 9 Drawing Figures

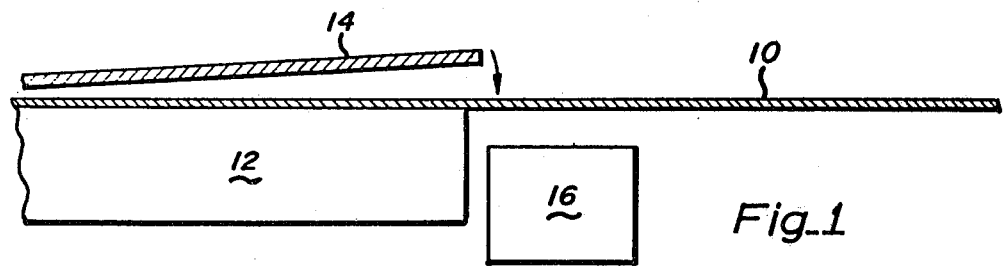
Fig_1
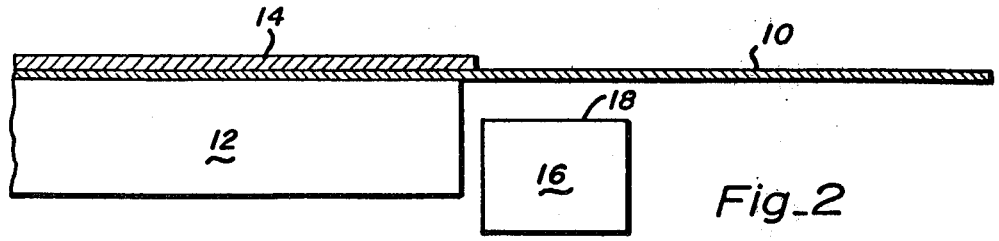
Fig_2
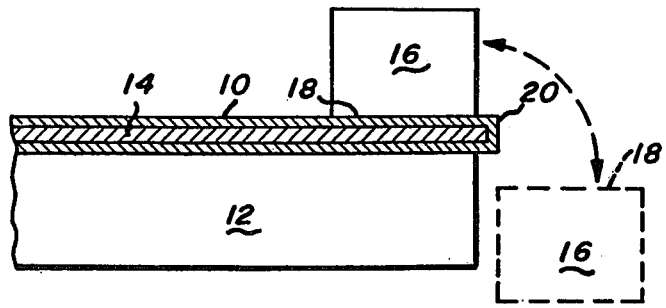
Fig_3
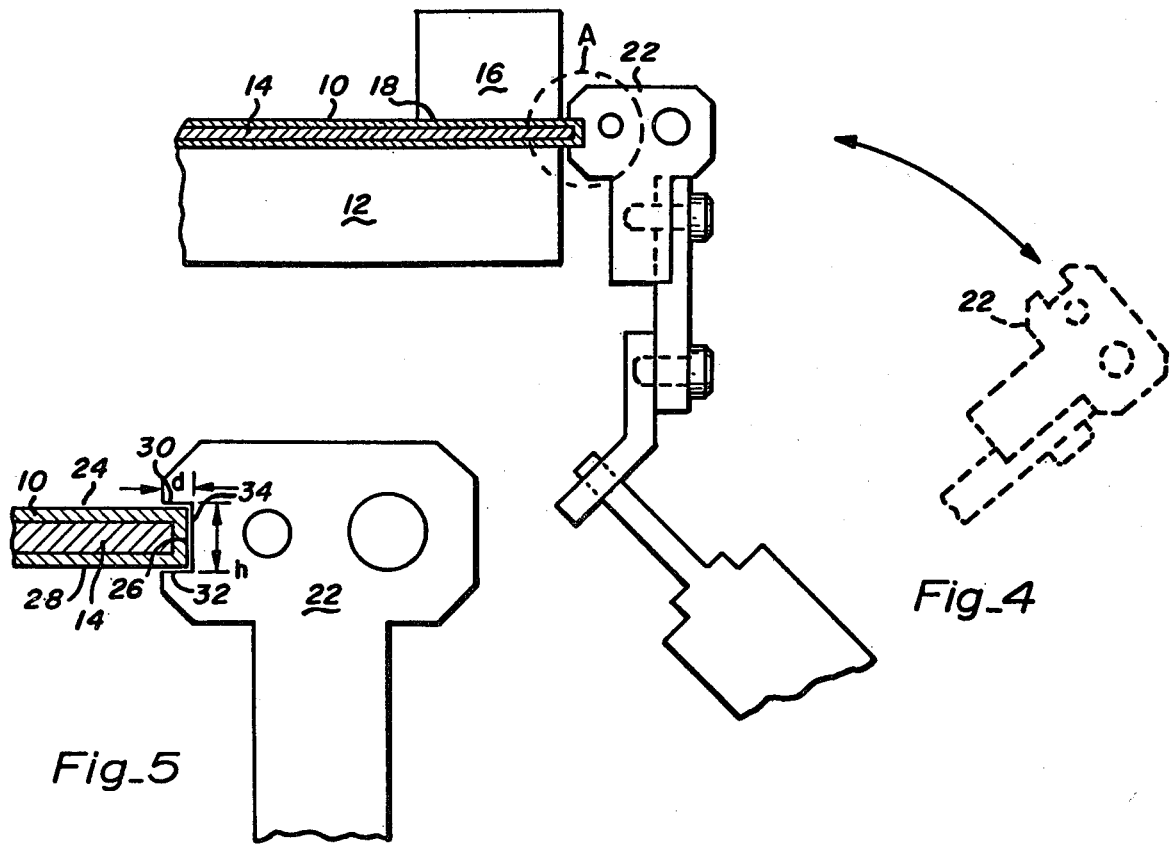
Fig_4
Fig_5

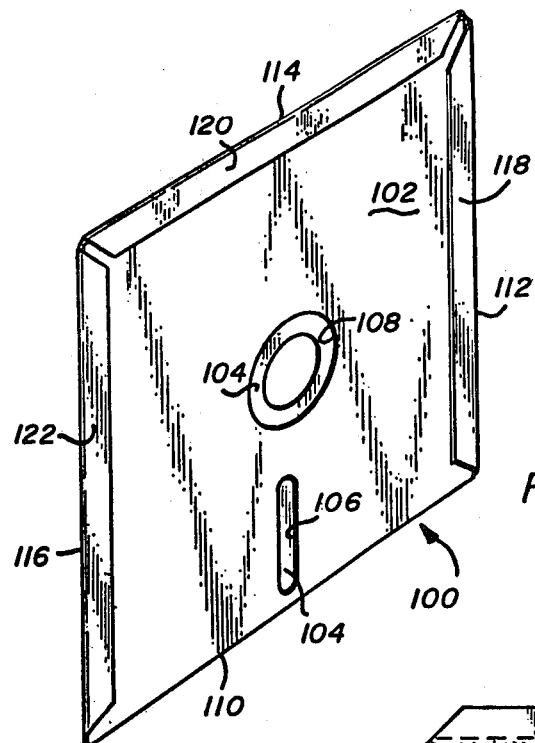
Fig_6
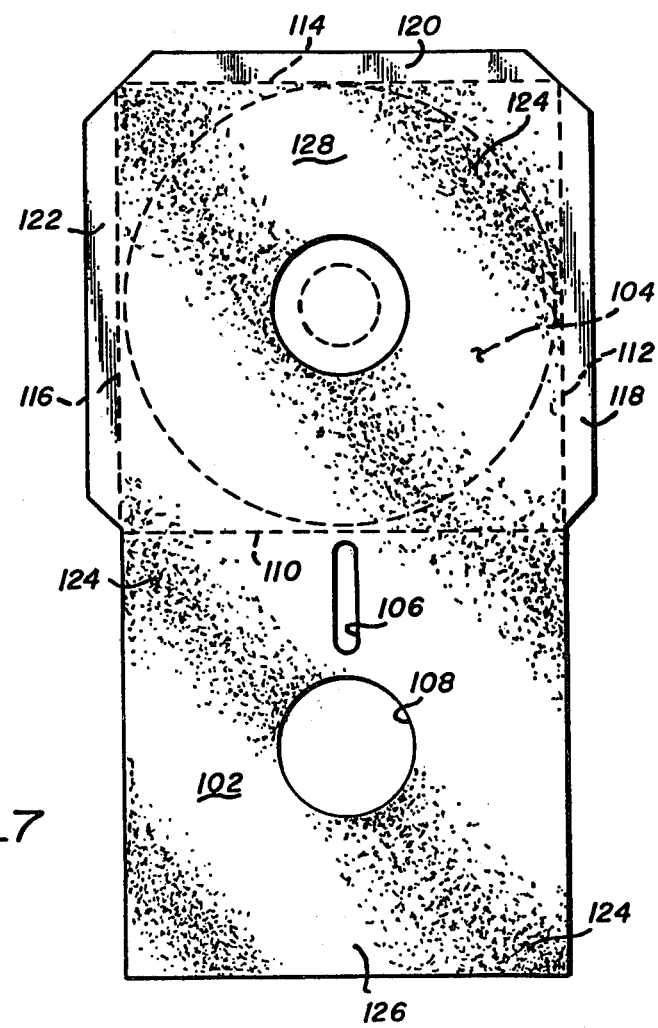
Fig_7

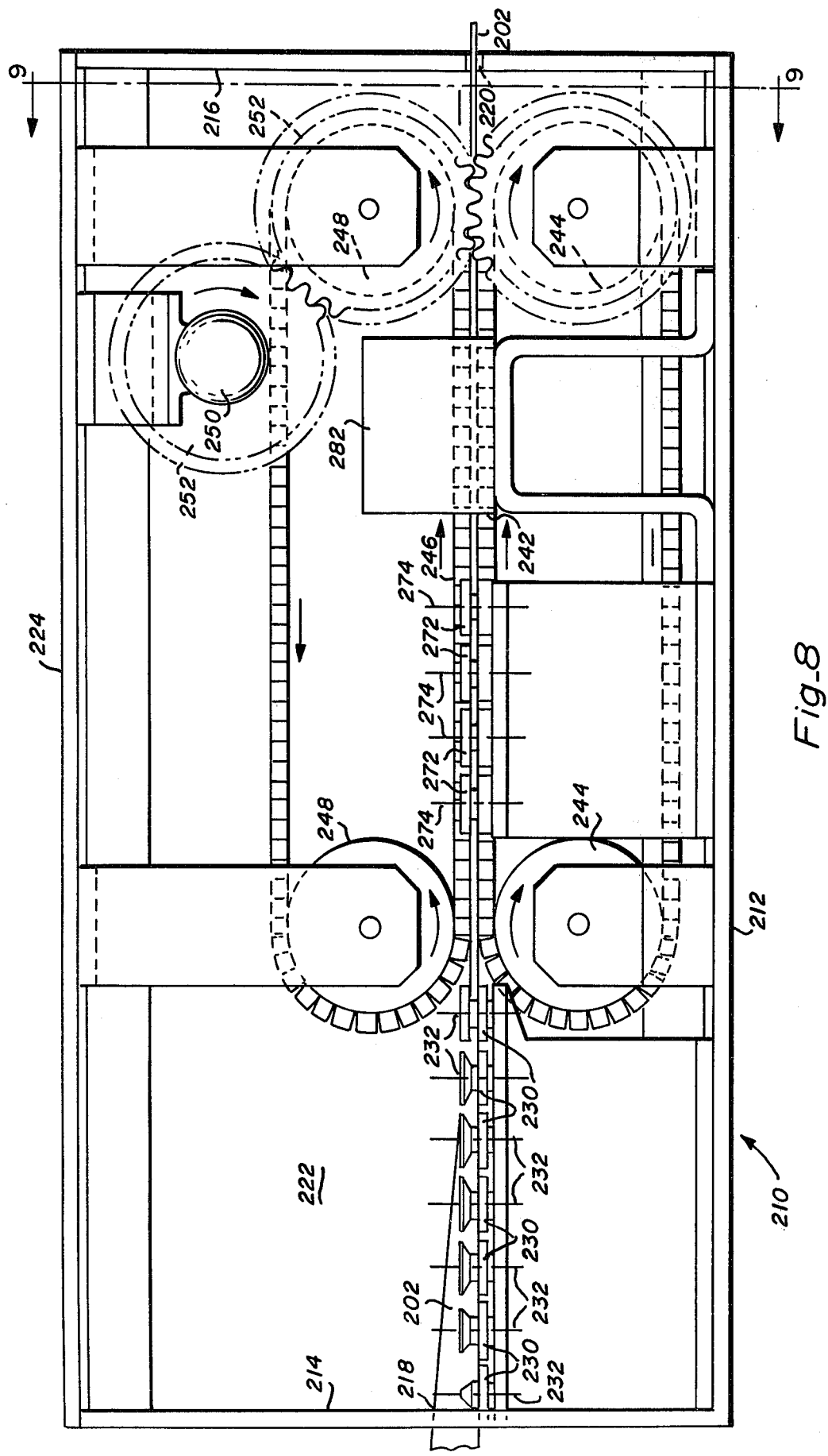
Fig_8

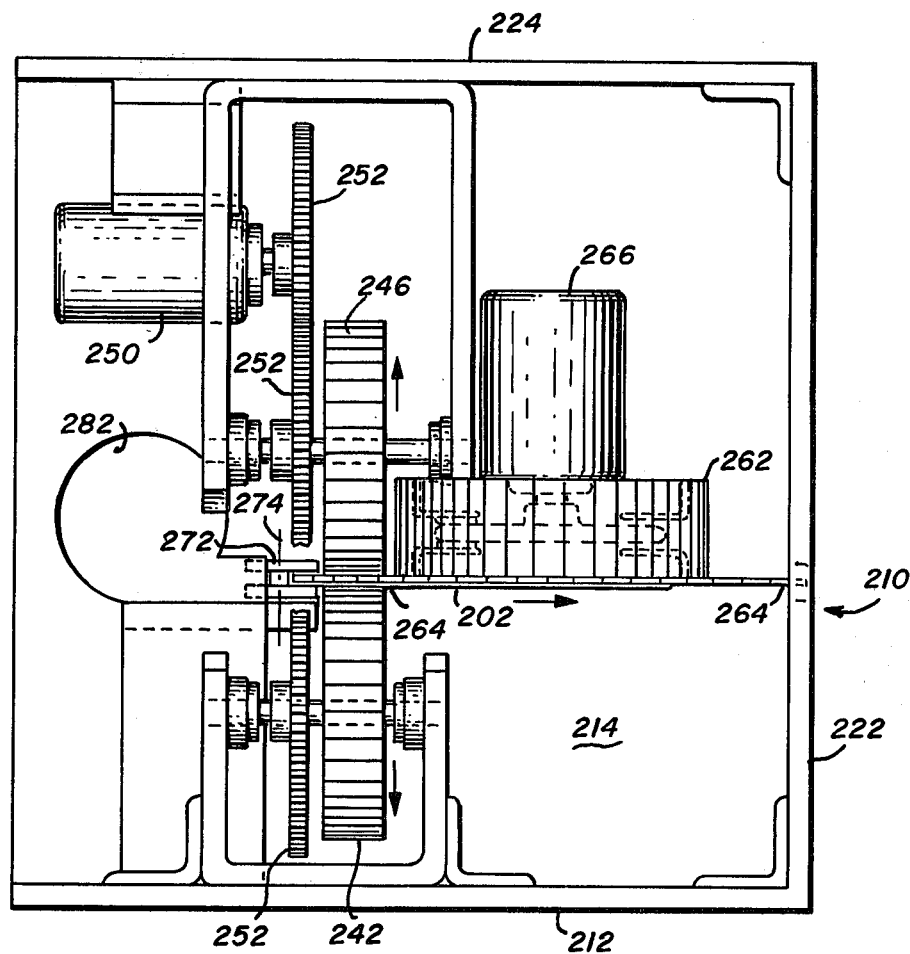
Fig_9

FORMING PROCESS FOR LIGHT GAUGE POLYMER SHEET MATERIAL

This application is a continuation-in-part of copending U.S. patent application Ser. No. 102,777 now U.S. Pat. No. 4,294,640.

BACKGROUND OF THE INVENTION

1. Field of the Invention

The invention relates to a method for providing uniform and warp-free folds in light gauge polymer sheet materials and finds particular application in the manufacture of jackets for flexible magnetic disks.

2. Description of the Prior Art

Flexible magnetic disks of various configurations have been commercially available since the early 1970's. In order that information recorded upon a particular flexible magnetic disk be readable upon a variety of flexible magnetic disk drives, certains standards for disk uniformity and dimensions have been developed. One such standard configuration is the American National Standards Institute (ANSI) X3B8/77-118 (June 27, 1977) specification.

Flexible magnetic disks must operate with certain mechanical and electrical characteristics so that the integrity of the data is maintained. For example, there is a torque specification which requires that the resistance to rotate the flexible magnetic disk within the flexible magnetic disk jacket be within predetermined values. Rotating torques in excess of the specification can create data reliability problems. In addition, the jacket which encloses and protects the flexible magnetic disk must be flat within specified tolerance limits. Jackets which are not flat within the allowable extremes tend to cause excessive torque to rotate the flexible magnetic disk within the jacket and to cause data reliability problems due to head-to-disk contact instability and/or separation. The material from which the flexible magnetic disk jackets have been universally constructed is polyvinyl chloride (PVC).

PVC will meet the technical criteria as a material from which to construct the flexible magnetic disk jacket in accordance with ANSI X3B8/77-118. However, PVC has a deformation or "softening" temperature of approximately 125° F. For applications in which the flexible magnetic disk will be exposed to temperatures in excess of 125° F., the PVC jacket tends to warp and become generally unusable destroying any possibility of recapturing the data stored upon the flexible magnetic disk. For example, military applications often are such that extreme temperatures must be sustained, and PVC has proven unacceptable. It has thus been known for some time that other materials that could withstand higher temperatures without deforming would be desirable to extend the useful operating range of flexible magnetic disks.

A material which is readily available and highly desirable for use as a flexible magnetic disk jacket is a polycarbonate known commonly as Lexan. Lexan polycarbonate has a deformation "softening" temperature of 321° F. It is a much "tougher" material than PVC. However, manufacturers of flexible magnetic disks have been unable to successfully produce a Lexan flexible magnetic disk jacket primarily due to the difficulties in forming light gauge Lexan sheet so that the folded structure of the jacket meets the flatness criteria of ANSI X3B8/77-118. The readily available literature supplied by the General Electric Company, manufacturer of Lexan light gauge polycarbonate sheet material, is wholly inadequate to produce a suitably formed Lexan flexible magnetic disk jacket. Preheating the Lexan sheet as suggested by General Electric and subsequently forming and/or folding such sheets into the desired jacket structure invariably results in a warped jacket that is out of ANSI tolerances. Moreover, the available technical literature for forming and/or folding polycarbonate light sheet material does not indicate any practical heating and/or bending fixturing that would aide in achieving a structure useful in the flexible magnetic disk application.

The prior art does describe techniques for producing stress free structures constructed from polymer materials, but such disclosures are generally not applicable to the forming of light gauge polymer sheet materials, especially Lexan polycarbonate. For example, U.S. Pat. No. 3,555,135 issued to Paul describes a method for molding substantially rectilinear-shaped structures from thermoplastic polymers with the improvement being stress relief at the corners of the structures so formed by the localized application of heat. According to the teachings of Paul, heat is applied in a generally uncritical manner to the corner of structures after said structures have been injection molded. The amount of heat applied and the time for application of such heat is sufficient so that the temperature of the polymer is raised to a temperature not exceeding 1° less than the crystalline freeze point of the material from which the structure is molded but not lower than 50° below said crystalline freeze point. While the concept of thermally induced stress relief at the corners of polymer structures is clearly disclosed by Paul, the invention is directed to injection molded parts and not to structures formed from commonly available polymer sheet material. Moreover, Paul does not disclose any details relating to the uniformity with which the heat must be applied to achieve the desired stress relief or the details of any heating or bending fixturing.

U.S. Pat. No. 3,200,182 issued to Hechelhammer et al describes a method for stress relieving a shaped polycarbonate structure. As was true in Paul, the concept of stress relief of a polymer through the use of heat is old in the art. Hechelhammer et al indicates that polycarbonate can be stress relieved if it is subjected for a long period of time to a temperature of from approximately 248° F. to 293° F. (i.e., approximately 120° C. to 145° C.). Hechelhammer et al indicates that approximately one hour of such heat treatment is required per millimeter of wall thickness. As this is practicably unacceptable, Hechelhammer et al teaches the exposure of the polycarbonate article to a temperature of from approximately 572° F. to 2192° F. (i.e., approximately 300° C. to 1200° C.). The exposure to these relatively extremely high temperatures is for a rather short duration. Hechelhammer et al is directed to the rapid stress release of injection molded or extruded polycarbonate structures and contains no teachings which relate to the bending or folding of light gauge polycarbonate sheet material. Moreover, Hechelhammer et al contains no teachings which relate to achieving extreme dimensional stability for a formed or folded structure. Moreover, it has been found in practice that use of temperatures in excess of 375° F. (i.e., 191° C.) cause bubbling of polycarbonate sheets of the Lexan type.

In the specific area of Lexan polycarbonate flexible disk jackets, Memorex Corporation manufactures a model FD-65 flexible magnetic disk with a Lexan jacket. However, this flexible magnetic disk jacket is not folded, but rather the jacket is made from a composite of a plurality of Lexan polycarbonate flat layers.

SUMMARY OF THE INVENTION

It is thus an object of the present invention to provide a method whereby polymer sheet materials may be formed and/or folded without introducing excessive bending or warping into the folded or formed structure.

It is another object of the present invention to provide a method for forming and/or folding polymer materials which is both simple to practice, inexpensive, and easy to implement in manufacturing.

It is yet another object of the present invention to provide a method for the forming and/or folding of light gauge Lexan polycarbonate material so as to construct a jacket adapted for a flexible magnetic disk.

The method of the present invention in a preferred embodiment is directed to the practical production of flexible magnetic disks utilizing Lexan polycarbonate jackets. In direct conflict with the prior art, the method of the present invention utilizes a light gauge Lexan polycarbonate sheet which is cold-formed about a mandrel plate. Folding bars are utilized to bend and retain the polycarbonate sheet. After bending and without permitting slippage of the polycarbonate sheet material, heat is applied to the corner edge of the bended material. The heat is controlled within tight limits so that the stress relief achieved along the bent and/or formed edge is uniform; a heater bar is provided for actually contacting and heating the folded and/or formed edge of the flexible disk Lexan polycarbonate jacket. In order that stress relief of the folded Lexan polycarbonate jacket is achieved over the entire lengthwise dimension of the folded edge, it is necessary that the folding bars rigidly retain the folded jacket while the heater bar is in contact with the folded edge. The profile of the heater bar which contacts the lengthwise dimension of the folded jacket edge must make intimate contact with said edge, and it has been found effective to use a heater bar profile which is in the shape of a U-shaped channel with planar sidewalls perpendicular to a planar bottom wall.

The time for stress relieving the folded edge of the Lexan polycarbonate flexible disk jacket has been found acceptable when the duration of contact between the heater bar and the folded edge is in the range of 3 to 7 seconds.

An alternative embodiment of the present invention is a method for forming a warp-free article having a folded edge from a moving web of light gauge polymeric material. In this alternative embodiment, the moving web is first folded and guided onto a moving, continuous mandrel by a series of progressive forming rollers thereby forming the folded edge. The web as then folded about and moving with the mandrel is then clamped between two opposing, moving continuous belt pressure tracks which retain the web in its folded condition. The web, mandrel and pressure tracks are constructed to move in synchronism so there is no slippage between the clamped web and either the mandrel or the pressure tracks. As it moves, the folded edge of the web then contacts a series of heated shaping rollers formed to mate with the outer surface of the folded edge. These heated rollers apply heat to the folded edge in a manner analogous to that of the heater bar of the heretofore described preferred embodiment. After the material of the web has been heated through contact with the shaping rollers, it is then maintained in its clamped position about the continuous mandrel by the pressure tracks while simultaneously being cooled to a temperature beneath the material's glass transition temperature.

It is another advantage of the present invention to provide a method for folding and/or forming Lexan polycarbonate which does not require preheating of said Lexan polycarbonate sheet material.

It is yet another advantage of the present invention to provide a method for folding and/or forming Lexan polycarbonate which is both inexpensive and easy to implement in the manufacture of flexible magnetic disk jackets.

These and other objects and advantages of the present invention will become apparent to those skilled in the art by referring to the following description of the preferred embodiment and by reference to the several drawing figures.

IN THE DRAWINGS

FIG. 1 is a view of the initial insertion of a Lexan polycarbonate sheet into an apparatus for folding in accordance with the method of the preferred embodiment of the present invention;

FIG. 2 illustrates the Lexan polycarbonate sheet of FIG. 1 in a clamped position;

FIG. 3 illustrates the Lexan polycarbonate sheet of FIG. 1 in a folded condition retained by a folding bar;

FIG. 4 illustrates the method of stress relieving the folded corner by application of heat through a heater bar;

FIG. 5 is an expanded view of detail "A" of FIG. 4;

FIG. 6 is a perspective view of a flexible magnetic disk;

FIG. 7 is a planar view of the preformed jacket of FIG. 6 in an unfolded condition;

FIG. 8 is a plan view showing an apparatus forming a folded edge in a moving web of light gauge polymeric material in accordance with an alternative embodiment of the method of the present invention; and FIG. 9 is a cross-sectional view of the apparatus for forming a folded edge in a moving web taken along the line 9—9 of FIG. 8.

DESCRIPTION OF THE PREFERRED EMBODIMENT

The method of the present invention can be applied to various applications in which a relatively flat, warp free folded article constructed from light gauge polymer sheet is desired. In particular, the method, in its preferred embodiment, has been applied with success to the manufacturer of a Lexan polycarbonate flexible disk jacket. In conformance with ANSI specification X3B8/77-118, the flexible disk jacket has square external dimensions of approximately eight inches on a side with generally perpendicular corners. The manufacturing process of the present invention for the jacket utilizes light gauge Lexan polycarbonate sheet material of 0.010 inch thickness which is performed with the necessary corners and tabs that will be required in the folding operation. The method of the present invention provides the folding and/or forming procedure in order to achieve a Lexan polycarbonate jacket which meets the flatness of warpage tolerance of the ANSI specification.

FIGS. 1–4 illustrate application of the method of the present invention to forming a 180° fold into an edge of a flexible magnetic disk jacket constructed from light gauge Lexan sheet material. Referring to FIG. 1, a flat sheet of Lexan polycarbonate 10 is inserted between a rigid base 12 and a folding insert 14. Lexan polycarbonate sheet 10 is inserted so that it is positioned against suitable stops (not shown). The Lexan polycarbonate sheet 10 is generally at room temperature during this insertion.

As shown by the arrow in FIG. 1, folding insert 14 is thereafter urged downward and comes into planar contact with Lexan polycarbonate sheet 10. As illustrated in FIG. 2, Lexan polycarbonate sheet 10 is thereafter held between folding insert 14 and rigid base 12.

Referring to FIG. 3, a folding bar 16, with a top surface 18, thereafter rotates in an upward manner with the surface 18 in contact with the sheet 10. This folds the polycarbonate sheet 10 about folding insert 14. Thereafter, pressure is exerted to the bar 16 so that surface 18 of folding bar 16 rigidly clamps Lexan polycarbonate sheet 10 wrapped about folding insert 14 to rigid base 12. In successfully practicing the method of the present invention, it has been found desirable to cause folding bar 16 to move in an arc where the center of rotation of folding bar 16 is generally about a line 20 as shown in FIG. 3. Line 20 extends along the entire lengthwise edge of the fold.

With Lexan polycarbonate sheet rigidly retained as shown in FIG. 3, it is now necessary to stress relieve the folded corner. Application of heat to the folded corner is utilized for such stress relieving, and FIG. 4 illustrates a heater bar 22 used for this purpose. During the folding operation as illustrated by the FIGS. 1 through 3, heater bar 22 is in a "rest" or disengaged position as shown in phantom in FIG. 4. During the stress relieving operation, heater bar 22 is moved into engagement with the folded edge. Heater bar 22 contacts the folded edge over its entire lengthwise dimension. In a successful application of the method of the present invention, electric heater elements have been utilized (not shown) for inducing the necessary temperature into heater bar 22. Detail A of FIG. 4 is shown in magnified view in FIG. 5 (rigid base 12 and folding bar 16 are not shown in FIG. 5) in order to illustrate the profile of contact between heater bar 22 and the folded edge of Lexan polycarbonate sheet 10.

It has been found in practicing the method of the present invention that intimate contact between heater bar 22 and Lexan polycarbonate sheet 10 is critical. Simple edge contact between heater bar 22 and Lexan polycarbonate sheet 10 has not proven effective.

FIG. 5 illustrates a detailed view of the contact between heater bar 22 and the folded corner of Lexan polycarbonate jacket 10. Lexan polycarbonate jacket 10 has a top surface 24, an edge surface 26, and a bottom surface 28. Heater bar 22 is adapted to contact Lexan polycarbonate jacket 10 along surfaces 24, 26 and 28. Heater bar 22 has a U-shaped trough constructed from a sidewall 30, a sidewall 32, and a bottom wall 34. Sidewalls 30 and 32 meet bottom wall 34 at generally a right angle. The depth of sidewalls 30 and 32 is denoted in FIG. 5 by the letter "d"; the height of bottom wall 34 is similarly denoted in FIG. 5 by the letter "h". In constructing the simple fold shown in FIG. 5, "d" is 0.045 to 0.055 inches and "h" is 0.080 to 0.085 inches. If dimension "d" is significantly smaller than 0.045 inches, proper corner stress release is not achieved. If "d" significantly exceeds 0.055 inches, cosmetic blemishes tend to be impressed into surfaces 24 and 28 of Lexan polycarbonate jacket 10. Likewise, if dimension "h" significantly exceeds 0.085 inches, surfaces 30 and 32 of heater bar 22 will not properly contact surfaces 24 and 28 of Lexan polycarbonate jacket 10. Proper intimate contact between the surfaces noted is a requirement to achieve sufficient stress relief at the corners. If dimension "h" is significantly less than 0.080 inches, then heater bar 22 tends to shear Lexan polycarbonate jacket 10 along the length of folding insert 14.

While the method described above is relatively straightforward, certain factors in practicing the method of the present invention have been found to be important. First, the temperature of heater bar 22 should be preferably maintained within ±2° F. over the entire length of heater bar 22. Further, the temperature of heater bar 22 should be preferably maintained at 375±3° F. in order to achieve proper stress relief. In order to achieve such accurate temperature control, use of a proportional temperature controller driving the electrical heater elements has been found to be necessary. Second, heater bar 22 must be kept in contact with Lexan polycarbonate jacket 10 for a sufficient period of time to cause adequate stress relief. The duration of contact between heater bar 22 and Lexan polycarbonate jacket 10 which proves satisfactory has been in the range of three to seven seconds. Contact times between heater bar 22 and Lexan polycarbonate jacket 10 in excess of seven seconds tends to cause the Lexan polycarbonate jacket 10 to bubble and/or warp; contact durations less than five seconds tends to be too short, adequate stress relief is not achieved, and, thus, the Lexan polycarbonate jacket 10 tends to warp due to the residual stresses left in the fold. Third, the contact profile of the heater bar 22 with Lexan polycarbonate jacket 10 is rather important. As shown in FIG. 5, surfaces 30, 32, and 34 within heater bar 22 form a U-shaped channel with perpendicular walls. Experimentation with alternative heater bar contact geometries has proven that alternative designs are less effective if not unacceptable. For example, a circular trough in place of the U-shaped trough has proven unacceptable. Moreover, a semicircular dimple impressed into surface 34 has proven unacceptable. As already noted above, dimensions "d" and "h" for the U-shaped trough must be held rather closely in order not to have adverse effects upon the stress-relieving operation. Thus, the geometry, time contact, temperature, and uniformity of the heater bar 22 when in contact with the folded corner are extremely important.

As briefly discussed above, the method of the present invention for folding light-gauge Lexan polycarbonate sheet has been successfully applied to the manufacture of flexible magnetic disk jackets. A flexible magnetic disk jacket of the type documented in ANSI X3B8/77-118 is illustrated in perspective in FIG. 6. FIG. 7 illustrates a planar view of the jacket of FIG. 6 in an earlier manufacturing condition wherein the Lexan polycarbonate is precut but still in a flat sheet.

Referring to FIG. 6, a flexible magnetic disc assembly including magnetic media is shown by the general reference character 100. Flexible magnetic disk assembly 100 is basically constructed from a jacket 102 and a flexible magnetic disk 104. Flexible magnetic disk assembly 100 is adapted to be matingly received by a flexible magnetic disk drive (not shown) of the conventional type. Disk assembly 100 has a slotted opening 106 and a central circular opening 108. Opening 106 provides access of a magnetic recording transducer to the disk 104 located within the magnetic recording drive. Opening 108 allows a spindle located within the flexible magnetic disk drive to contact disk 104 and cause said disk 104 to rotate so that the magnetic recording process can be performed.

Jacket 102 of disk assembly 100 is a folded structure with folded edges 110, 112, 114 and 116. Folded edge 110 is a "simple" fold constituting a 180° bend in the Lexan polycarbonate not unlike that described in connection with FIGS. 1 to 5 above. Tabs 118, 120, and 122 are utilized to create edges 112, 114, and 116, respectively.

Referring to FIG. 7, disk assembly 100 is shown with jacket 102 in an unfolded condition. FIG. 7 illustrates disk 104 in phantom inserted into the proper position prior to folding although it is not actually inserted into the jacket until after folded edges 110, 112, and 116 have been formed (described below). FIG. 7 also shows a typical jacket liner 124 attached to the inside of jacket 102. A lint-free fibrous liner 124 is commonly used on the inside of flexible disk jackets. Liner 124 is heat sealed to the inside of jacket 102 as shown.

FIG. 7 illustrates the four folded edges 100, 112, 114, and 116 as dotted lines. Using the method as described in connection with FIGS. 1 to 5 using a square folding insert 14 with dimensions approximating the locations of edges 110, 112, and 116, edge 110 is folded first. In this manner, a front panel 126 of jacket 102 is folded on top of a rear panel 128 of jacket 102. Thereafter, tabs 118 and 122 are folded on top of front panel 126. Once tabs 118 and 122 are folded, edges 110, 112, and 116 are stress relieved by application of heat from a heater bar in a manner as illustrated in connection with FIGS. 4 and 5. It should be noted that some form of sealing between tabs 118 and 122 and front panel 126 must be employed so as to retain tabs 18 and 122 into bonded contact with front panel 126 after stress relief. In this regard, adhesive sealing for the Lexan polycarbonate has been successfully employed.

Once edges 110, 112, and 116 have been heat stress relieved and tabs 118 and 122 have been sealed to front face 126, the jacket 102 is formed into a "pocket" with an open end. A disk 104 is thereafter inserted, and a folding, stress relief, and sealing operation is performed on tab 120 and edge 114 as was described for edges 112 and 116 and for tabs 118 and 122, respectively. After edge 114 is formed and tab 120 sealed, jacket 102 of disk 100 is ready for electrical and mechanical testing.

In practice, flexible magnetic disks 100 constructed in accordance with the present invention from Lexan polycarbonate jackets 102 have successfully performed at a temperature in excess of 160° F. and a relative humidity in excess of 80°. Such performance is not attainable using jackets 102 constructed from PVC as is known in the prior art.

FIGS. 8 and 9 are an alternative embodiment of apparatus of the present invention for forming a warp-free article having a folded edge from a web 202 of light gauge Lexan polycarbonate polymeric material. The forming of a folded edge on the web 202 is performed by a forming apparatus 210. The forming apparatus 210 includes a bottom wall 212 above which at opposite terminal ends thereof project perpendicularly a left end wall 214 and a right end wall 216. The left end wall 214 includes an entry opening 218 by which the web 202 enters the forming apparatus 210 while the right end wall 216 includes an exit opening 220 by which the formed web 202 leaves the forming apparatus 210. Projecting upward along one edge of the bottom wall 212, perpendicular thereto and spanning the distance between the end walls 214 and 216 is a rear wall 222. Spanning the distance between the end walls 214 and 216 at their terminal ends furthest from the bottom wall 212 and projecting outward perpendicularly from the end walls 214 and 216 and the rear wall 222 is a top wall 224. Within the apparatus 210, supported from the bottom wall 212 thereof and aligned along that portion of the linear path between the entry opening 218 and the exit opening 220 closest to the left end wall 214 is a series of progressive forming rollers 230. The rollers 230 are secured to be respectively rotatable about an axis 232 aligned perpendicular to the linear path between the entry opening 218 and the exit opening 220. The rollers 230 are shaped and positioned so that the web 202 is gradually folded by its contact therewith as it progresses from the entry opening 218 toward the exit opening 220.

Supported from the bottom wall 212 and located both immediately beneath the linear path between the entry opening 218 and the exit opening 220 and between the forming roller 230 furthest from the left end wall 214 and the right end wall 216 is a first, lower, continuous belt pressure track 242. The pressure track 242 is carried by a pair of cylindrical rollers 244 respectively rotatably supported from the bottom wall 212 adjacent to the right end wall 216 and the forming roller 230 furthest from the left end wall 214. Thus, the rollers 244 translatably support the lower pressure track 242 along an oval path within the forming apparatus 210. A second, upper, continuous belt pressure track 246 is similarly translatably suspended in opposition to the lower pressure track 242 and is positioned immediately above the linear path between the entry opening 218 and the exit opening 220. As with the lower pressure track 242, the upper pressure track 246 is supported along an oval path within the forming apparatus 210 by a pair of cylindrical rollers 248 rotatably suspended from the top wall 224. Also suspended from the top wall 224 is a track drive motor 250 which drives the pressure tracks 242 and 246 in synchronism by means of a series of meshing gears 252.

Also supported within the forming apparatus 210 between the pressure tracks 242 and 246 and the rear wall 222 is a continuous folding mandrel 262. In a manner similar to the pressure tracks 242 and 246, the continuous folding mandrel 262 is guided along an oval path around a pair of cylindrical rollers (not shown). The oval path of the continuous folding mandrel 262 is aligned perpendicular to the parallel paths of the pressure tracks 242 and 246 and parallel to the linear path between the entry opening 218 and the exit opening 220. One of the linear portions of the oval path of the continuous folding mandrel 262 is positioned immediately adjacent to the upper pressure track 246 so that sizing terminal ends 264 of the mandrel 262 may extend outward therefrom to project through the immediately adjacent portion parallel segments of the pressure tracks 242 and 246. Thus, the web 202 as it is folded by the series of progressive forming rollers 230 is guided about the terminal ends 264 of the forming mandrel 262 projecting between the tracks 242 and 246. The space between the adjacent portions of the tracks 242 and 246 is established so as to clamp the folded web 202 to the terminal end 264 about which it is folded. Thus, properly translating the continuous folding mandrel 262 about its oval path by means of a mandrel drive motor 266 in synchronism with the pressure tracks 242 and 246 causes the forming apparatus 210 to drive the folded web 202 along the linear path between the entry opening 218 and the exit opening 220. Properly adjusted to move in synchronism, there is no slippage between the clamped web 202 and either the continuous mandrel 262 or the continuous pressure tracks 242 and 246.

Located immediately adjacent to the sizing terminal ends 264 of the continuous folding mandrel 262 projecting between the adjacent segments of the forming tracks 242 and 246 and positioned near the end thereof closest to the entry aperture 218 are a series of heated shaping rollers 272. The shaping rollers 272 are supported from the bottom wall 212 to be respectively rotatable about axis 274 aligned parallel to the axis 232 of the forming rollers 230. Further, the heated shaping rollers are formed to mate with and contact the outer surface of the web 202 as folded about the sizing terminal ends 264 of the continuous folding mandrel 262. Thus, the heated rollers 272 apply heat to the folded edge of the web 202 as it is clamped between the pressure tracks 242 and 246 and is driven from the entry opening 218 to the exit opening 220 in a manner analogous to that of the heater bar 22 of the preferred embodiment. A cooling blower 282 is also located immediately adjacent to the edge of the web 202 as folded about the sizing terminal ends 264 of the continuous folding mandrel 262 and is located between the heated shaping rollers 272 and the exit opening 220. Thus, after the material of the web 202 has been heated through contact of the shaping rollers 272, it is maintained in its clamped position about the sizing terminal ends 264 by the pressure tracks 242 and 246 while simultaneously being cooled to a temperature beneath the material's glass transition temperature.

When in operation, the forming apparatus 210 forms a moving web of room temperature, light gauge polymeric material into a substantially warp-free folded article as follows. First, the moving web 202 is folded about the sizing terminal ends 264 of the continuous folding mandrel 262 by the series of progressive forming rollers 230. Proper operation of the forming apparatus 210 requires that the continuous folding mandrel 262 moves so that the sizing terminal ends 264 move in synchronism with the web 202. After the web 202 has been folded about the synchronisly moving sizing terminal ends 264, it is clamped between the first moving, continuous belt pressure track 242 and the second, moving continuous belt pressure track 246. Proper operation of the forming apparatus 210 requires that the continuous belt pressure tracks 242 and 246 move in synchronism with the web 202 as folded about the synchronously moving sizing terminal ends 264 so the moving web 202 is retained in its bolted condition without slippage with respect to either the sizing terminal ends 264 or the pressure tracks 242 and 246. Thus folded about the sizing terminal ends 264 and clamped by the pressure tracks 242 and 246, the outer surface of the moving web 202 then contacts a series of heated shaping rollers 272 formed to mate with the outer surface of the web 202 along its folded edge. The heated shaping rollers 272, which are maintained generally at a temperature of 387° F.±3° F. apply heat uniformly along the folded edge of the web 202 while the web moves at a linear velocity of approximately fifty feet per minute. After passing the final heated shaping roller 272, the moving web 202 as folded about the sizing terminal ends 264 and clamped thereto by the pressure tracks 242 and 246 passes the cooling blower 282 where the heated material of its edge is cooled to a temperature below that material's glass transition temperature. After being cooled, the moving web 202 is released from its clamped position about the sizing terminal ends 274 to lead the forming apparatus 210 through the exit aperture 220.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method for forming a sheet of light gauge polymeric material into a substantially warp-free folded article comprising the steps of:

clamping a sheet of light gauge polymeric material of polycarbonate between a first substantially rigid base and a second substantially rigid folding member which protrudes slightly beyond said first substantially rigid base, said sheet of polymeric material being essentially at room temperature;

folding said sheet around said second substantially rigid folding member by means of a substantially rigid folding bar whereby a folded edge is formed in said sheet;

retaining said sheet in said folded condition without slippage by means of said substantially rigid folding bar with the edge of said substantially rigid folding bar protruding only to a distance of said first substantially rigid base and recessed from the protrusion of said substantially rigid folding member; and applying heat uniformly along said folded edge of said retained sheet by contacting an outer surface of said sheet with a heated bar shaped to mate with said surface of said sheet along said folded edge; wherein said folding forms an article having a substantially 180° flat fold;

said heated bar shaped to mate with said outer surface of said sheet is a U-shaped trough whereby the slight protrusion of said second substantially rigid folding member beyond said first substantially rigid base and said substantially rigid folding bar allows said U-shaped trough to accept the edge of said 180° flat fold therein; and said heated bar is heated to a temperature and contacted to said outer surface of said sheet for a time period, the combination of temperature and time period being selected to relieve stress in said folded edge of said sheet without substantially deforming said folded edge of said sheet.

2. The method of claim 1, wherein said U-shaped trough has planar sidewalls that are perpendicular to a planar bottom wall.

3. The method of claims 1 or 2, wherein said folded article is a flexible disk jacket.

4. The method of claim 1, wherein said heated bar is maintained generally at a temperature of 390° F.±3° F. with a temperature uniformity end-to-end of ±2° F. and maintained in contact with said folded edge for a duration of approximately five to seven seconds.

5. A method for forming a moving web of light gauge polymeric material into a substantially warp-free folded article comprising the steps of:

folding a moving web of light gauge polymeric material of polycarbonate about moving sizing terminal ends of a continuous folding mandrel by means of a series of progressive forming rollers whereby a folded edge is formed in said web, said web of material being essentially at room temperature, and said sizing terminal ends moving in synchronism with said web;

clamping said moving web as folded about said synchronously moving sizing terminal ends between a first moving continuous belt pressure track and a second moving continuous belt pressure track, said continuous belt pressure tracks moving in synchronism with said web as folded about said synchronously moving sizing terminal ends with said moving web retained in said folded condition substantially without slippage with respect to said sizing terminal ends and said moving continuous belt pressure tracks, and with said sizing terminal ends of said folding mandrel along with said moving web which said terminal ends protruding slightly beyond the edges of said continuous belt pressure tracks;

applying heat uniformly along said folded edge of said retained moving web by contacting an outer surface of said said web with a series of heated shaping rollers formed to mate with said outer surface of said web along said folded edge, said outer surface of said web being heated thereby to a temperature sufficient to relieve internal stress present in said folded edge of said web; and cooling said heated edge of said moving web to a temperature below said material's glass transition temperature while maintaining said moving web in a clamped position about said terminal ends by means of said continuous belt pressure tracks; wherein said folding forms an article having a substantially 180° flat fold; and a surface of said heated shaping rollers shaped to mate with said outer surface of said sheet is a U-shaped trough; whereby the slight protrusion of said terminal ends of said moving web beyond said edges of said continuous belt pressure tracks allows said U-shaped trough to accept the edge of said 180° flat fold of said moving web therein.

6. The method of claim 5, wherein said U-shaped trough has planar side walls that are perpendicular to a planar bottom wall.

7. The method of claim 5, wherein said heating shaping rollers are maintained generally at a temperature of 387° F.±3° F. while said web moves at a linear velocity of approximately 50 feet per minute.

* * * * *